J. GRANT & A. G. COOK.
Tree-Protector.
No. 204,561. Patented June 4, 1878.
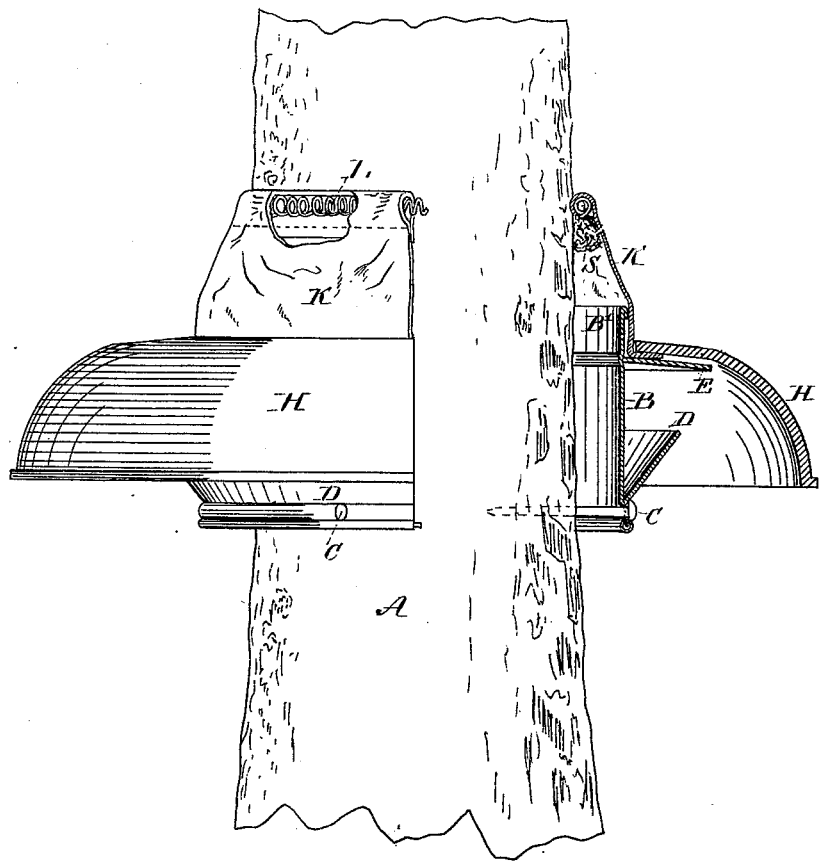
WITNESSES.
Nat'l Evans
Ernest N. Boyden
INVENTORS
Jott Grant
Albert G. Cook
Per William Edson Atty.

UNITED STATES PATENT OFFICE.

JOTT GRANT AND ALBERT G. COOK, OF BOSTON, MASSACHUSETTS.

IMPROVEMENT IN TREE-PROTECTORS.

Specification forming part of Letters Patent No. 204,561, dated June 4, 1878; application filed March 20, 1878.

*To all whom it may concern:*

Be it known that we, JOTT GRANT and ALBERT G. COOK, both of Boston, in the county of Suffolk and State of Massachusetts, have jointly invented a new and useful Improvement in Tree-Protectors, of which the following is a specification:

Tree-protectors of the oil-trough class, as heretofore constructed, have been either so made as to be light, and not durable, yielding to the weather or to cattle; or, if made sufficiently durable, have been so firmly packed about the tree that the packing will finally "girdle" the tree, and also absorb so much water as to become liable to freeze, and thus injure the tree.

Our invention consists in combining with the other parts of the tree-protector a cylindrical sheet-metal casing, which is nailed to the tree, leaving a clear air-space all around, said casing supporting and forming a part of the oil-trough, and also holding the water-shed above the oil-trough, the cylinder extending above the water-shed, and affording, in connection with a strong cast-iron shield or cattle-guard, a convenient device for connecting the lower end of a flexible bag or insect-barrier to the holding-cylinder and water-shed, the upper end of said bag being held tight to the tree by an elastic cord or spring and a few small nails or tacks, the object being to furnish a firm durable protector, and at the same time not to injure the tree.

In seasons when the insects do not run, the lower end of the bag may be slipped out from between the cast-metal shield and the top of the water-shed and turned up, so as to allow of an examination of the trunk of the tree and a free circulation of air.

The drawing represents a tree with our protector attached, the protector being shown partly in elevation and partly in section.

Let A represent the body of the tree; B, a cylinder of zinc or other suitable sheet metal. This cylinder B is held firmly in place by nails C' C', at a distance from the bark of the tree sufficient to leave a clear air-space entirely around the tree. D is the oil-trough, and E the water-shed, both being attached to the cylinder B, as shown in section. K is a flexible bag, the upper end of which may be hemmed and gathered in, the hem inclosing a spiral spring, L, or elastic cord, by means of which the said upper end is held with a yielding pressure to the bark of the tree. If desirable, a small quantity of cotton-waste may be inserted at S' to fill small crevices in the bark, that might otherwise allow passage for insects. The lower end of this bag K lies between the extension B' of the cylinder B, the shed E, and the heavy shield H, the weight and firmness of the shield serving to hold the lower end in place.

To examine the body of the tree it is only necessary to lift the shield from the water-shed. This leaves the bag free to be turned up, so that the whole trunk of the tree is exposed to air and light.

Having now described the construction and operation of our invention, what we desire to secure by Letters Patent is the following:

In a tree-protector, the combination of the cylinder B B', oil-trough D, and water-shed E, with the shield H and bag K, all constructed as described, and for the purpose set forth.

JOTT GRANT.
ALBERT G. COOK.

Witnesses:
  NATL. EVANS,
  FRANK G. PARKER.